(12) United States Patent
Depeige

(10) Patent No.: US 8,485,028 B2
(45) Date of Patent: Jul. 16, 2013

(54) STRUCTURAL MEMBER OF AN AIRCRAFT HAVING A HOLLOW PART AND INDICATOR OF ICE FORMATION IN SUCH A HOLLOW PART

(75) Inventor: Alain Depeige, Tournefeuille (FR)

(73) Assignee: Airbus Operations S.A.S., Toulouse (FR)

( * ) Notice: Subject to any disclaimer, the term of this patent is extended or adjusted under 35 U.S.C. 154(b) by 284 days.

(21) Appl. No.: 12/989,080

(22) PCT Filed: May 20, 2009

(86) PCT No.: PCT/FR2009/000592
§ 371 (c)(1),
(2), (4) Date: Oct. 22, 2010

(87) PCT Pub. No.: WO2009/150326
PCT Pub. Date: Dec. 17, 2009

(65) Prior Publication Data
US 2011/0036949 A1     Feb. 17, 2011

(30) Foreign Application Priority Data
May 20, 2008   (FR) ...................................... 08 53265

(51) Int. Cl.
*G01P 13/00* (2006.01)
*G01N 5/02* (2006.01)

(52) U.S. Cl.
USPC ........................................... 73/170.02; 73/73

(58) Field of Classification Search
USPC ...................................................... 73/170.02
See application file for complete search history.

(56) References Cited

U.S. PATENT DOCUMENTS

| | | | | |
|---|---|---|---|---|
| 4,611,492 A | * | 9/1986 | Koosmann | 73/579 |
| 4,873,510 A | * | 10/1989 | Khurgin | 340/580 |
| 5,226,448 A | | 7/1993 | Schiller | |
| 5,748,091 A | * | 5/1998 | Kim | 340/583 |
| 6,010,095 A | * | 1/2000 | Hackmeister | 244/134 F |
| 7,845,221 B2 | * | 12/2010 | Severson et al. | 73/170.02 |
| 8,060,334 B1 | * | 11/2011 | Jarvinen | 702/136 |
| 2010/0206991 A1 | * | 8/2010 | Severson et al. | 244/134 F |

FOREIGN PATENT DOCUMENTS

| | | |
|---|---|---|
| EP | 0 393 960 A1 | 10/1990 |
| FR | 2 680 871 | 3/1993 |
| FR | 2 707 315 | 1/1995 |
| GB | 501201 | 2/1939 |

OTHER PUBLICATIONS

International Search Report issued Oct. 1, 2009 in PCT/FRO9/00592 filed May 20, 2009.

* cited by examiner

*Primary Examiner* — Andre Allen
(74) *Attorney, Agent, or Firm* — Oblon, Spivak, McClelland, Maier & Neustadt, L.L.P.

(57) ABSTRACT

A structural element of an aircraft includes a hollow part. An indicator provides a visual indication, for example by moving, if ice forms in a given region of the hollow part.

14 Claims, 1 Drawing Sheet

STRUCTURAL MEMBER OF AN AIRCRAFT HAVING A HOLLOW PART AND INDICATOR OF ICE FORMATION IN SUCH A HOLLOW PART

BACKGROUND OF THE INVENTION

This invention relates to a structural element of an aircraft having a hollow part and an indicator of formation of ice in such hollow part.

The outer surfaces of an aircraft (whether, for example, on the fuselage or the wing group) generally are formed by a relatively thin skin, which therefore is stiffened in standard manner by structural elements, such as frames and stringers, for example.

In order to play their mechanical part correctly without excessive contribution of weight, these structural elements frequently have shapes that define a hollow part within the structural element, such as the commonly used omega stringers.

Such hollow parts then may form an inopportune container for liquids, typically condensation and runoff water, in particular for structural elements located at a low point of the part (for example of the fuselage) concerned.

This presence of water proves to be problematic when the temperatures encountered lead to a changeover to the solid state (in practice the formation of ice) which, because of the changes in volume associated with the change of state inside the fixed volume of the structural element, may be accompanied by mechanical stresses detrimental to the mechanical strength of the structural element, by the way, however, with no damage being visible from the outside.

This risk is particularly serious in the case of structural elements made of composite material in which the frost may lead to a separation of the element or to a delamination.

A visual signal of the presence of frost already has been proposed in document FR 2 680 871. This document, however, applies to the general detection of frost on the airplane and therefore in no way considers the possible consequences of frost on the structural elements.

SUMMARY OF THE INVENTION

In this context, the invention proposes a structural element of an aircraft comprising a hollow part, characterized by means able to provide a visual indication in case of formation of ice in a given region of the hollow part.

In this way it is possible, for example during a routine inspection, to easily detect the parts having sustained a flood and in which there is a risk of damage to the mechanical qualities of the structural element.

These means able to provide a visual indication comprise, for example, an indicator installed in the structural element in a first position and able to assume a second position under the effect of forces exerted by ice in formation in the said given region. The visual indication thus is provided in particular by the displacement of the indicator because of the increase in volume associated with the change in state, which is an especially simple manner of detecting the formation of ice.

The indicator further may comprise anti-return means able to limit a movement of the indicator from the second position to the first position, so that the visual indication may relate, if need be, to a presence of water at a time prior to that of the inspection.

In practice the indicator is installed, for example, sliding in an aperture of the structural element, along with possibly at least one elastic tab bearing at least one boss such that the diameter of the indicator at the boss is greater than the diameter of the aperture.

In this context, the boss is located, for example, inside the structural element (that is to say generally in the hollow part) in the first position and outside the structural element in the second position.

In this way the functionalities contemplated above are achieved in a manner easy to implement.

The invention also proposes an indicator of the presence of water such as set forth above as well as an aircraft with a structural element such as mentioned above.

BRIEF DESCRIPTION OF THE DRAWINGS

Other characteristics and advantages of the invention will become more apparent in the light of the description that follows, presented with reference to the attached drawings in which.

DETAILED DESCRIPTION OF THE INVENTION

Figure 1:
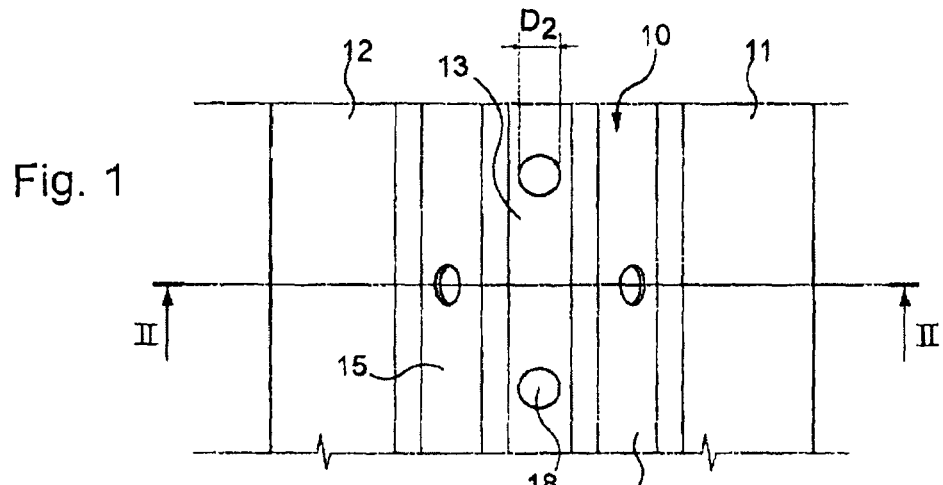
FIG. 1 shows a structural element (here a stringer) able to be equipped with an indicator in accordance with the teachings of this invention.
Figure 2:
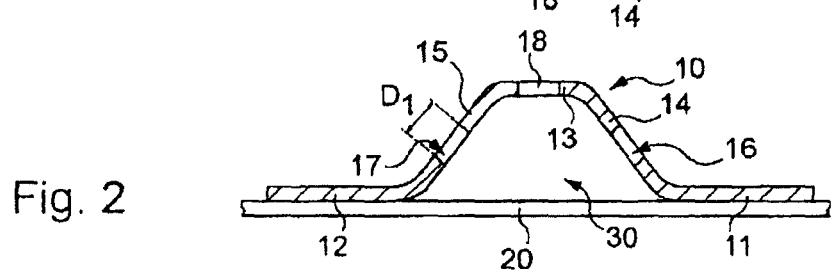
FIG. 2 shows a section according to line II-II of FIG. 1.

There has been shown on FIGS. 1 and 2 an omega stringer 10 fastened (for example by bonding) onto a skin 20 with a view to reinforcement of the latter.

The stringer extends according to a general direction perpendicular to the section plane of FIG. 2, on which the omega shape is clearly visible.

Stringer 10 thus has tabs 11, 12 essentially flat, parallel and bonded to skin 20. These tabs 11, 12 are located on both sides of a central region of stringer 10 made up of a base-plate 13 essentially parallel to skin 20 but at a distance therefrom and which continues on both sides respectively in a side-plate 14, 15 that extends obliquely in relation to skin 20 as far as the corresponding tab 11, 12.

Stringer 10 is produced, for example, from a part made of composite material.

Side-plates 14, 15 of stringer 10 have, for example at regular intervals, drainage holes 16, 17 (one of which for each side-plate is visible on FIGS. 1 and 2) with diameter $D_1$ here equal to 10 mm, in order in particular to drain off liquids (mainly water) likely to end up (for example through runoff or through condensation) inside hollow space 30 formed between stringer 10 and skin 20 (precisely between skin 20 and side-plates 14, 15 and base-plate 13 of stringer 10).

Despite the presence of drainage holes 16, 17, it is possible, however, that liquids will accumulate in hollow space 30 defined between stringer 10 and skin 20, for example in the case in which drainage holes 16, 17 are clogged, or also in regions of the hollow space in which holes 16, 17 do not allow a proper drainage of the liquids (such as, for example, at a stringer end located below drainage holes 16, 17).

For this reason there is provided (particularly in the sensitive zones that have just been mentioned) an ice-formation indicator 40 able to signal by means of a visual indication the formation of ice in a given region of hollow space 30 defined by skin 20 and stringer 10.

Figure 3:
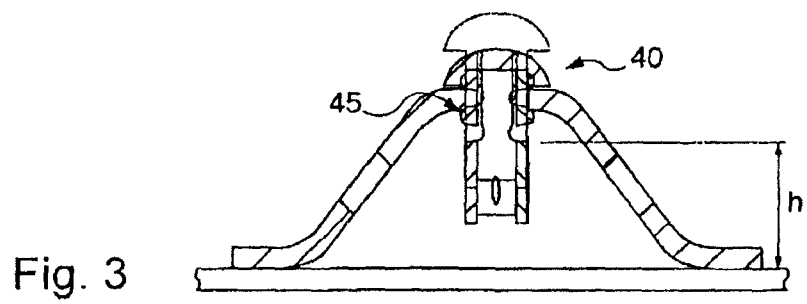
FIG. 3 shows the stringer of FIG. 1 in which the indicator in accordance with the teachings of the invention is installed.

FIG. 3 shows such an indicator 40 installed sliding in an aperture (here with diameter $D_2$ equal to 6 mm) of base-plate 13 of stringer 10 and provided with anti-return elements (here anti-return pawls 45) so as to remain in an "extended" position (visible in dotted lines on FIG. 3) subsequent to a movement of indicator 40 toward the outside because of the formation of ice in the hollow part.

Figure 4:
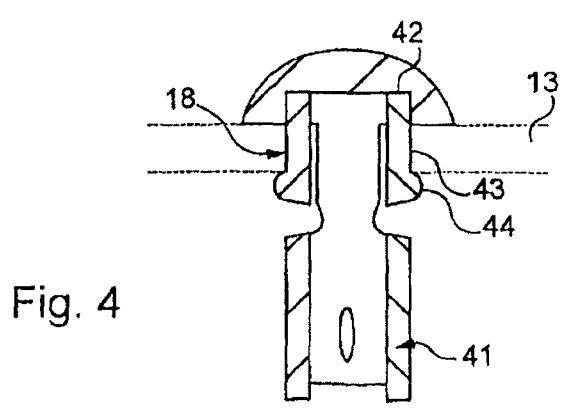
FIG. 4 is a sectional view of the indicator of FIG. 3.

As visible on FIG. 4, indicator 40 is made up, for example, of a general cylindrical part 41 with outside diameter slightly smaller than diameter $D_2$ of apertures 18 formed in the base-plate so as to be able to slide as already indicated in these apertures 18.

The indicator also comprises a head 42, for example set onto cylindrical part 41. Head 42 has a diameter greater than that of aforementioned aperture 18 so as to stop the sliding of indicator 40 (downward on the Figures).

Indicator 40 also comprises elastic tabs 43 located in the continuation of cylindrical part 41 at rest and each ending with a boss 44, so as to form at bosses 44 located on elastic tabs 43 a diameter greater than diameter $D_2$ of aforementioned aperture 18.

Indicators 40 (several indicators being able to be disposed each in an aperture 18 of a sensitive zone mentioned above) are inserted into their aperture 18 by retracting bosses 44 toward the inside of cylindrical part 41 by action on elastic tabs 43 (for example by means of a suitable tool) until head 42 of the indicator comes into contact with base-plate 13 of stringer 10, where indicator 40 has a position referred to as "retracted," in which bosses 44 stop the sliding of indicator 40 (upward on the Figures).

As long as the space defined between skin 20 and stringer 10 is not filled with ice (and the presence of water or ice therefore is not detrimental to the mechanical qualities of the structural element), the indicator remains in this retracted position by virtue of the relative stiffness of elastic tabs 43 and the presence of bosses 44 that immobilize indicator 40 in relation to base-plate 13.

On the other hand, in case of formation and of significant presence of ice in the space defined by stringer 10 and skin 20, here if the ice level is greater than level h visible on FIG. 3, the indicator is pushed toward the outside of space 30, in particular during the formation of ice because of the increase in volume associated with this change of state, so that elastic tabs 43 bend inward until the bosses no longer prevent the rising of indicator 40 toward the outside of the space (upward on FIG. 3) and indicator 40 thus reaches the position shown in a dotted line on FIG. 3. Bosses 44 preferably have a shape adapted for facilitating this rising of indicator 40.

Once indicator 40 is moved into extended position, bosses 44 prevent return into retracted position even if the ice melts and the water is drained off (for example by evaporation) from space 30, which makes it possible to detect the prior presence of ice (and the risk of weakening of the associated structural element) even during a later inspection when the ice no longer is present.

In this way, during a routine inspection it is easy to detect the zones of the structure for which icing has taken place and to conduct in these zones a more precise determination of the actual presence of a separation or a delamination, for example with the aid of non-destructive monitoring means.

The example described above is only one possible embodiment of the invention. It is conceivable, for example, to detect the formation of ice in the hollow part by electric or electronic means (for example by tripping a switch as a result of movement of the indicator described above or by means of sensors of the forces exerted by the ice in formation) and to generate a visual indication of this detection for example by means of a warning light connected to these electric or electronic detection means.

The invention claimed is:

1. A structural element of an aircraft comprising:
a hollow part of the structural element; and
a visual indicator that provides a visual indication of formation of ice in a given region of the hollow part,
wherein the visual indicator includes an indicator installed in the structural element in a retracted position and is configured to assume an extended position under effect of forces exerted by the ice in formation in the given region, and
wherein the indicator includes anti-return means configured to limit a movement of the indicator from the extended position to the retracted position.

2. The structural element according to claim 1, wherein the indicator is installed sliding in an aperture of the structural element.

3. The structural element according to claim 2, wherein the indicator includes at least one elastic tab bearing at least one boss such that the diameter of the indicator at the boss is greater than the diameter of the aperture.

4. The structural element according to claim 3, wherein the boss is located inside the structural element in the retracted position and outside the structural element in the extended position.

5. The structural element according to claim 1, wherein the structural element is a stringer.

6. An aircraft comprising the structural element according to claim 1.

7. An indicator of formation of ice configured to be installed in a structural element of an aircraft in a retracted position and to assume an extended position under effect of forces exerted by the ice in formation in a given region of a hollow part of the structural element, including anti-return means to limit a movement of the indicator from the extended position to the retracted position.

8. The indicator according to claim 7, further comprising at least one elastic tab bearing at least one boss configured to be located inside the structural element in the retracted position and outside the structural element in the extended position.

9. The structural element according to claim 5, wherein the stringer is omega-shaped.

10. The structural element according to claim 5, wherein the stringer includes two flat tabs parallel to a skin of the aircraft, a base-plate parallel to the skin of the aircraft, and two side-plates that each extend obliquely between the base-plate and one of the two flat tabs.

11. The structural element according to claim 10, wherein the base plate includes an aperture in which the indicator slides.

12. The structural element according to claim 10, wherein the two side-plates include drainage holes.

13. The structural element according to claim 3, wherein the at least one boss extends outward from the indicator.

14. The structural element according to claim 2, wherein the indicator includes a head having a diameter greater than that of the aperture to stop sliding of the indicator.

* * * * *